US008388902B2

(12) United States Patent
Zhang (10) Patent No.: US 8,388,902 B2
(45) Date of Patent: Mar. 5, 2013

(54) METHOD AND APPARATUS FOR REGENERATING ACTIVATED COKE USED FOR TREATING WASTEWATER OR SEWAGE

(75) Inventor: Dawei Zhang, Shenyang (CN)

(73) Assignees: Dawei Zhang, Shengyang, Liaoning Province (CN); Mississippi International Water, Inc., Valley Stream, NY (US)

( * ) Notice: Subject to any disclaimer, the term of this patent is extended or adjusted under 35 U.S.C. 154(b) by 348 days.

(21) Appl. No.: 12/809,557

(22) PCT Filed: Dec. 16, 2008

(86) PCT No.: PCT/CN2008/002018
§ 371 (c)(1),
(2), (4) Date: Jun. 18, 2010

(87) PCT Pub. No.: WO2009/089679
PCT Pub. Date: Jul. 23, 2009

(65) Prior Publication Data
US 2010/0311568 A1    Dec. 9, 2010

(30) Foreign Application Priority Data

Dec. 19, 2007  (CN) .......................... 2007 1 0179895

(51) Int. Cl.
*C01B 31/08* (2006.01)
*B01J 38/06* (2006.01)
*B01J 8/10* (2006.01)

(52) U.S. Cl. ........ 422/202; 422/204; 422/205; 422/209; 422/219; 422/223; 422/228; 422/232; 422/233; 502/55

(58) Field of Classification Search ................. 422/202, 422/204, 205, 209, 219, 223, 228, 232, 233; 502/55
See application file for complete search history.

(56) References Cited

U.S. PATENT DOCUMENTS

| 1,875,223 | A | * | 8/1932 | Davis ........................... 202/136 |
| 4,123,332 | A | * | 10/1978 | Rotter ............................ 201/15 |
| 7,811,083 | B2 | * | 10/2010 | Bohringer et al. ............ 432/118 |

FOREIGN PATENT DOCUMENTS

| AU | 4098789 A | 3/1990 |
| CN | 2279209 Y | 4/1998 |
| CN | 101073767 A | 11/2007 |
| CN | 201136802 Y | 10/2008 |
| CN | 101306814 A | 11/2008 |
| JP | 2004-351312 | 12/2004 |
| ZA | SA 896714 | * 3/1990 |

* cited by examiner

*Primary Examiner* — Jennifer A Leung
(74) *Attorney, Agent, or Firm* — Muncy, Geissler, Olds & Lowe, PLLC (57) ABSTRACT

A method for regenerating activated coke used for treating wastewater or sewage is provided. The method includes loading the activated coke to an environment under 150 to 250° C., heating the activated coke to a temperature of 700 to 850° C. for about 40 to 90 minutes; and providing a steam to the activated coke with a rate of 0.1 to 0.5 m$^3$/(ton of activated coke). When the activated coke is being heated at the temperature, it generates a gas mixture including a steam portion and at least a paraffine gas. The gas mixture flows along a reverse direction relative to a flow of cooling water, so that the steam portion is converted into a part of the cooling water for recycling. The paraffine gas is used as a fuel. An apparatus for regenerating the activated coke used for treating wastewater or sewage is also provided.

6 Claims, 2 Drawing Sheets

METHOD AND APPARATUS FOR REGENERATING ACTIVATED COKE USED FOR TREATING WASTEWATER OR SEWAGE

BACKGROUND OF THE INVENTION

1. Field of the Invention

The present invention relates generally to a processing method, and more particularly, to a method and apparatus for regenerating an activated coke used for treating industrial wastewater or sewage.

2. The Prior Arts

In the modern environment-protection industry, there are many approaches proposed for treating the industrial wastewater or sewage. For example, an invention has been made to employ an activated coke filtering and adsorbing material having an Iodine adsorption value in a range of 400-800 mg/g in treating the industrial wastewater and sewage. The activated coke can be prepared by taking anthracite coal, lean coal, meagre coal, coking coal, rich coal, gas coal, long flame coal, brown coal, blue carbon, hard coke, or semi-coke as raw material and sequentially conducting drying, dry distillation, carbonization, and activation processes with the selected raw material. After using the activated coke to treat the industrial wastewater or sewage, it is desired to regenerate the used activated coke for recycling purpose. Generally, the cost of regenerating the used activated coke is pretty high and often takes a large percentage in the total cost of treating the industrial wastewater or sewage. As such, whether the treatment technology of employing the activated coke should be applied is often determined by whether the cost of regenerating the used activated coke can be reduced or not.

Generally, conventional equipment used for regenerating water-treatment filtering and adsorbing materials, such as vertical furnace or rake furnace is often very expansive. When such equipment is in operation, the generated flame and smoke remains in direct contact with the material, such that some of the material is consumed by combustion, or lost when exhausting the smoke. As such, the recycling rate of regenerating the water-treatment filtering and adsorbing material is typically low. Further, there is a large amount of steam contained in a gas mixture which is generated when regenerating the water-treatment filtering and adsorbing material, and the steam portions adversely affects the combustion of the gas mixture. Accordingly, the gas mixture cannot be recycled and has to be directly discharged in the atmosphere. This operation inevitably causes pollution and destroys the environment, and even wastes energy.

Moreover, almost all conventional equipment is adapted for continuous operation. However, sometime the activated coke is desired to be used in treating the wastewater discharged from a small or medium scale factory or a small county, in which the quantity of wastewater to be treated is relatively small. Therefore, only a small amount of activated coke needs to be recycled for reuse, so that the conventional equipment is not supposed to be continuously operated under that condition.

Therefore, it is desired to provide a method and an apparatus for regenerating the activated coke for the wastewater or sewage. In the process of regenerating the activated coke, the processed material is kept separated from the flame and smoke, so that the processed material won't be consumed in combustion or lost by exhaustion of smoke, thus improving the recycling rate of the activated coke. Further, the apparatus is desired to be capable of either continuously or intermittently operated, thus saving the cost of regenerating the activated coke, as well as the total cost of treating the wastewater or sewage. Furthermore, a portable apparatus which can be conveniently carried and transported is also desired for handling water pollution in emergency.

SUMMARY OF THE INVENTION

Accordingly, a primary objective of the present invention is to provide method for regenerating an activated coke for treating wastewater or sewage.

A further objective of the present invention is to provide an apparatus adapted for regenerating an activated coke for treating wastewater or sewage.

For achieving the foregoing objectives and other, the present invention provides a method for regenerating an activated coke for treating wastewater or sewage. In accordance with the present invention, the activated coke is maintained at 150 to 250° C. The activated coke is then heated to a temperature of 700 to 850° C. The temperature is maintained constant for about 40 to 90 minutes. Then, a steam is provided to the activated coke. Preferably, the steam is provided with a rate of 0.1 to 0.5 $m^3$/(ton of activated coke).

When the activated coke is being heated at the temperature, it generates a gas mixture including a steam portion and at least a paraffine gas. The gas mixture flows along a reverse direction relative to a flow of cooling water, so that the steam portion is converted into a part of the cooling water for recycling. The paraffine gas is used as a fuel.

According to an embodiment of the present invention, the activated coke is loaded in a heating chamber and fills up about 20% to 40% of a volume of the heating chamber.

According to an embodiment of the present invention, the paraffin gas includes carbon monoxide, nitrogen, hydrogen, carbon dioxide, methane, ethane, and ethylene.

According to an embodiment of the present invention, the regenerated activated coke has an Iodine adsorption value greater than 400-800 mg/g.

The present invention further provides an apparatus for regenerating an activated coke. The apparatus includes a heating chamber, a combustion chamber, a gas collecting chamber, and a discharging chamber. The heating chamber is disposed inside the combustion chamber. The heating chamber has a first end and a second end. The first end is coupled with an inlet pipe and the second end is coupled with an outlet pipe. The inlet pipe is adapted for charging the activated coke into the heating chamber therethrough for regenerating, and the outlet pipe is adapted for discharging the regenerated activated coke out from the heating chamber therethrough. The outlet pipe is connected to the discharging chamber, and a sealing device is provided for sealing a connection configured between the discharging chamber and the outlet pipe. The inlet pipe is connected to the gas collecting chamber, and a sealing device is provided for sealing a connection configured between the gas collecting chamber and the inlet pipe. The heating chamber has a length-diameter ratio in a range of 6:1 to 8:1. The inlet pipe has a length in a range of 0.5 to 1 meter. The outlet pipe has a length in a range of 1 to 1.5 meter. The inlet pipe has a diameter in a range of 300 mm to 600 mm, and the outlet pipe has a diameter in a range of 300 mm to 600 mm. The heating chamber is rotatable relative to the combustion chamber. The outlet pipe is adapted to be driven by a gearing to rotate, and correspondingly the outlet pipe carries the heating chamber to rotate together with the outlet pipe with a rotation speed of 2-5 r/min.

According to an embodiment of the present invention, the second end of the heating chamber is configured with a cone shape for coupling with the outlet pipe. The cone shape of the second end has a horizontal extending length in a range of 100 mm to 500 mm. The cone shape of the second end further includes a guiding plate provided therein for guiding the activated coke to move toward a certain direction.

According to an embodiment of the present invention, a distance from an outer wall of the heating chamber to two inner lateral sidewalls of the combustion chamber is in a range of 200 mm to 300 mm. A distance from the outer wall of the heating chamber to an inner top wall of the combustion chamber is in a range of 200 mm to 300 mm. A distance from the outer wall of the heating chamber to an inner bottom wall of the combustion chamber is in a range of 300 mm to 500 mm. The heating chamber includes an inner wall being in direct contact with the activated coke.

According to an embodiment of the present invention, the apparatus further includes a transmission gear ring provided at an outer wall of the outlet pipe. The transmission gear ring is operably coupled with the gearing. Further, the apparatus includes rolling rings provided at an outer wall of the inlet pipe and the outer wall of the outlet pipe. The rolling rings are seated on supporting rollers.

According to an embodiment of the present invention, the heating chamber includes a plurality of rows of protrusion plates configured inwardly protruding from the inner wall of the heating chamber. The protrusion plates are arranged with an angle of 5° to 20° relative to an axial direction of the heating chamber. Each row of protrusion plates distant from a next row for about 500 mm to 800 mm. Each row of protrusion plates includes a plurality of protrusion plates, and each of which remains a gap of 5 mm to 10 mm away from a next one. Each protrusion plate has a length of 500 mm to 800 mm and a height equivalent to about 15% to 25% of the diameter of the heating chamber.

According to an embodiment of the present invention, the outlet pipe includes a plurality of screw guiding plates secured to an inner wall of the outlet pipe. The screw guiding plates of the outlet pipe define an included angle relative to an axial direction of the outlet pipe. The included angle of the screw guiding plates of the outlet pipe is about sinistral 3° to 15°. The screw guiding plates of the outlet pipe have a height equivalent to about 15% to 30% of a diameter of the outlet pipe.

According to an embodiment of the present invention, the inlet pipe includes a plurality of screw guiding plates secured to an inner wall of the inlet pipe. The screw guiding plates of the inlet pipe define an included angle relative to an axial direction of the inlet pipe. The included angle of the screw guiding plates of the inlet pipe is about dextral 3° to 15°. The screw guiding plates of the inlet pipe have a height equivalent to about 15% to 40% of a diameter of the inlet pipe. The inlet pipe further includes a cleaning plate provided between each two adjacent screw guiding plates. The cleaning plate is positioned distant from the inner wall of the inlet pipe for about 5 mm and distant from the adjacent screw guiding plates for about 10 mm. Each cleaning plate is secured to a rack. The rack has an end secured to the loading conduit.

According to an embodiment of the present invention, the discharging chamber has a discharging opening configured at a bottom of the discharging chamber, and further includes an observing window, a temperature sensor, a negative pressure detection port, and a maintenance door configured at an outer sidewall of the discharging chamber.

According to an embodiment of the present invention, the gas collecting chamber includes a temperature sensor, a negative pressure detection port, and a maintenance door configured at an outer sidewall of the gas collecting chamber. Further, the gas collecting chamber includes an exhaust gas outlet configured at the outer sidewall of the gas collecting chamber.

According to an embodiment of the present invention, the apparatus further includes a screw conveyor, and a feeding storage. The screw conveyor is provided at a top side of the gas collecting chamber. The feeding storage is positioned over the screw conveyor. The gas collecting chamber further includes a loading conduit. The loading conduit has a first end connected to a discharging port of the screw conveyor, and a second end extending into the inlet pipe. The first end of the loading conduit is configured penetrating through a side wall of the gas collecting chamber and is further provided with a through opening.

According to an embodiment of the present invention, the apparatus further includes a cofferdam circularly configured at an ending portion of the inlet pipe along the inner wall of the inlet pipe. The cofferdam has an inner edge distant from an axial center of the inlet pipe for about 150 mm to 250 mm. The gas collecting chamber is further configured with an exhaustion opening for exhausting materials exceeded from the gas collecting chamber.

According to an embodiment of the present invention, the apparatus further includes an external fuel combustion device and a gas mixture combustion device provided at the sidewall of the combustion chamber and the bottom of the heating chamber respectively for heating the material (e.g., activated coke) inside the heating chamber. The temperature inside the heating chamber can be controlled by adjusting the heat provided by the external fuel combustion device and the gas mixture combustion device to the heating chamber. The fuel consumed by the external fuel combustion device for example can be natural gas, liquefied gas, coal gas, or diesel oil. The gas mixture combustion device consumes the gas mixture generated by thermo-decomposition of organics during the operation of the apparatus for regenerating an activated coke. The apparatus further includes a combustion-supporting air fan, an air preheating device, a steam superheater, and a chimney. The combustion-supporting air fan is adapted for providing combustion-supporting air for the external fuel combustion device and the gas mixture combustion device. The air preheating device has an inlet and an outlet. An outlet of the combustion-supporting air fan is connected with the inlet of the air preheating device, and the outlet of the air preheating device is connected via a combustion-supporting air conduit with gas inlets of the external fuel combustion device and the gas mixture combustion device. The inlet of the air preheating device is coupled with an emission opening of the combustion chamber. The air preheating device is disposed over the steam superheater. The outlet of the air preheating device is connected to the chimney.

According to an embodiment of the present invention, the apparatus further includes a column-shaped washing tower, a gas transporter, a circulating water tank, and a pump. The column-shaped washing tower has a gas inlet, a water outlet, a dreg removing opening, configured at a bottom side of the washing tower, a gas outlet provided at a top side of the washing tower, and a water inlet 40 and a maintenance door configured at an upper side of the washing tower. The washing tower includes an annular water conduit. The water conduit has one end coupled to the water inlet of the washing tower, and another end coupled with a sprayer. Plates configured with a plurality of through-holes are provided above the annular water conduit and below the sprayer respectively. The gas transporter includes an inlet and an outlet. The gas outlet of the washing tower is connected with the inlet of the gas transporter. The outlet of the gas transporter is coupled to the inlet of the gas mixture combustion device of the combustion chamber via a gas mixture conduit. The circulating water tank includes a water inlet connected to the water outlet of the washing tower, and a water outlet connected to a water inlet of the pump. The pump has a water outlet coupled to the water inlet of the washing tower.

According to an embodiment of the present invention, the combustion chamber is provided with a temperature sensor at an inner wall of the combustion chamber for detecting a temperature inside the combustion chamber.

According to an embodiment of the present invention, the inner wall of the combustion chamber is configured with a high-temperature refractory material. The combustion chamber further includes a metallic housing, and a heat insulating material layer between the inner wall and the metallic housing of the combustion chamber.

According to an embodiment of the present invention, the apparatus further includes a steam shunting cylinder having a steam inlet and a steam outlet. The steam inlet of the steam shunting cylinder is connected to an external steam conduit via a valve. The steam outlet of the steam shunting cylinder is connected to a steam inlet of a steam flow meter via a valve. The steam flow meter has a steam outlet coupled to a superheated steam inlet of the steam superheater. The steam shunting cylinder is provided with a pressure gauge and a drain valve.

According to an embodiment of the present invention, the superheated steam outlet of the steam superheater is coupled to a steam inlet of the discharging chamber. The steam superheater is made of high-temperature resistant stainless steel, and is assembled at an upper side of the combustion chamber for increasing the temperature of the steam inputted into the heating chamber.

According to an embodiment of the present invention, the apparatus further includes a controlling cabinet adapted for controlling the operation of the apparatus and monitoring the temperature inside the combustion chamber, adjusting the rotation speed of the heating chamber, and switching the rotation direction of the heating chamber.

According to an embodiment of the present invention, the apparatus includes a base, and all of the above-mentioned elements are assembled on the base.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
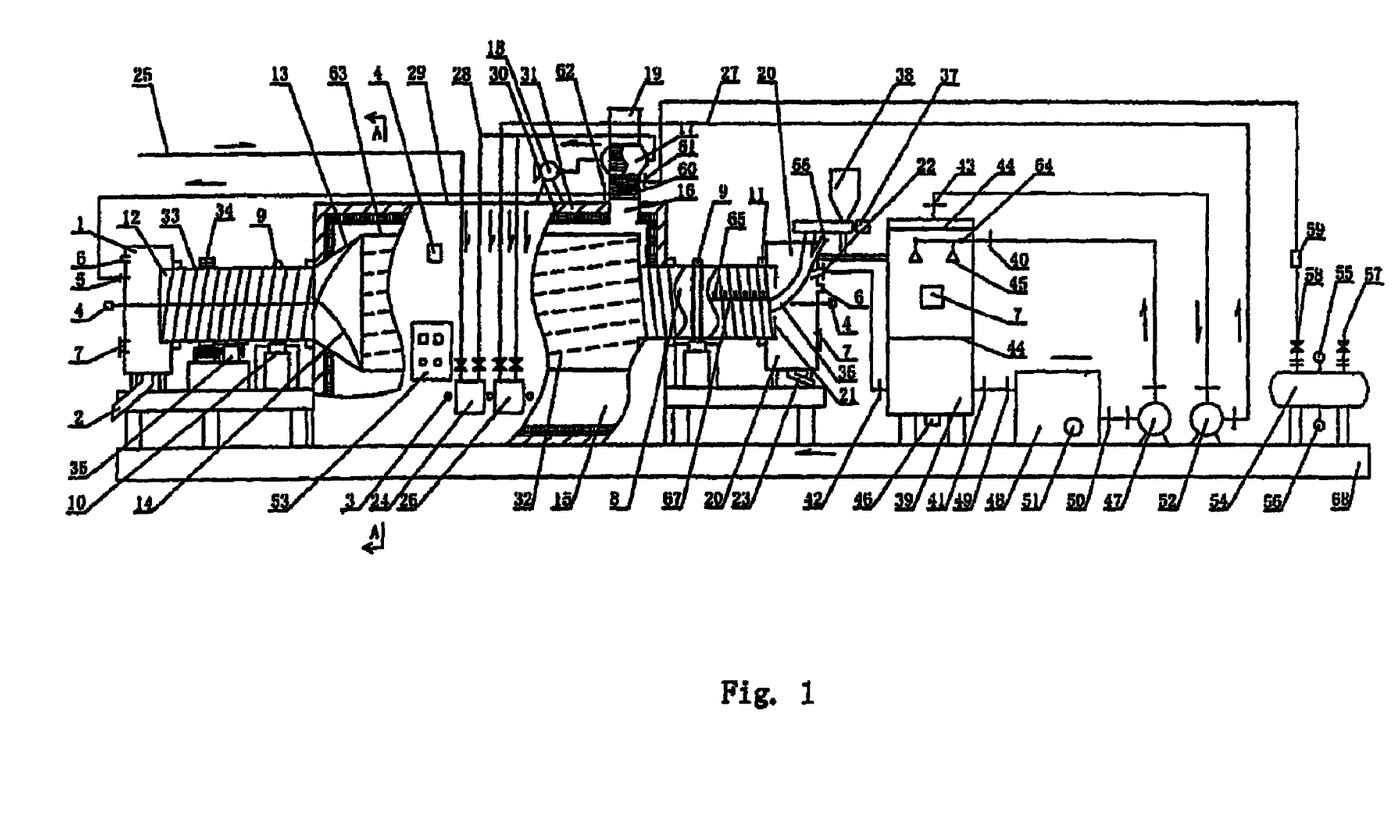
FIG. 1 is a schematic diagram illustrating the structure of an apparatus according to an embodiment of the present invention.
Figure 2:
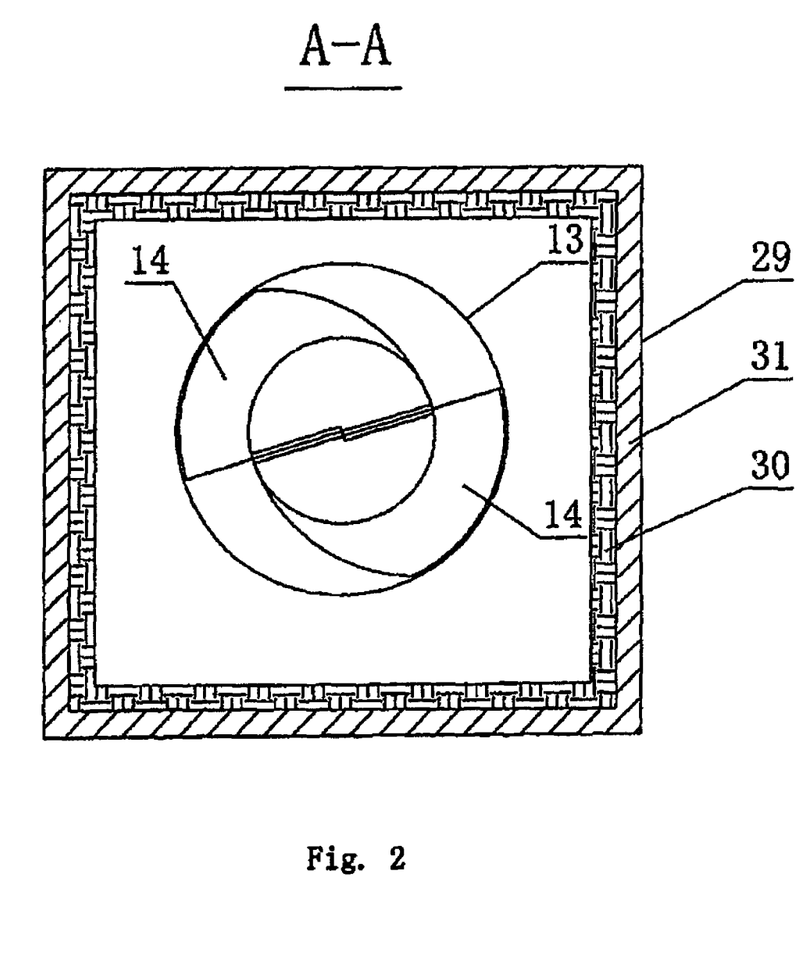
FIG. 2 is a cross-sectional view of the apparatus along line A-A.

FIG. 1 is a schematic diagram illustrating the structure of an apparatus according to an embodiment of the present invention. FIG. 2 is a cross-sectional view of the apparatus along line A-A.

Referring to FIGS. 1 and 2, the present invention provides an apparatus for regenerating an activated coke. The apparatus includes a heating chamber 63, a combustion chamber 15, a gas collecting chamber 20, and a discharging chamber 1.

The heating chamber 63 is disposed inside the combustion chamber 15. The heating chamber 63 has a first end and a second end. The first end is coupled with an inlet pipe 8 and the second end is coupled with an outlet pipe 12. The inlet pipe 8 is adapted for charging the activated coke into the heating chamber 63 therethrough for regenerating, and the outlet pipe 12 is adapted for discharging the regenerated activated coke out from the heating chamber 63 therethrough. The outlet pipe 12 is connected to the discharging chamber 1, and a sealing device 11 is provided for sealing a connection configured between the discharging chamber 1 and the outlet pipe 12. The inlet pipe 8 is connected to the gas collecting chamber 8, and a sealing device 11 is provided for sealing a connection configured between the gas collecting chamber 20 and the inlet pipe 8. The heating chamber 63 has a length-diameter ratio in a range of 6:1 to 8:1. The inlet pipe 8 has a length in a range of 0.5 to 1 meter. The outlet pipe 12 has a length in a range of 1 to 1.5 meter. The inlet pipe 8 has a diameter in a range of 300 mm to 600 mm, and the outlet pipe 12 has a diameter in a range of 300 mm to 600 mm. The heating chamber 63 is rotatable relative to the combustion chamber 51. The outlet pipe 12 is adapted to be driven by a gearing 35 to rotate, and correspondingly the outlet pipe 12 carries the heating chamber 63 to rotate together with the outlet pipe 12 with a rotation speed of 2-5 r/min.

The second end of the heating chamber 63 is configured with a cone shape 13 for coupling with the outlet pipe 12. The cone shape 13 of the second end of the heating chamber 63 has a horizontal extending length in a range of 100 mm to 500 mm. The cone shape 13 of the second end further includes a guiding plate 14 provided therein for guiding the activated coke to move toward a predetermined direction.

A distance from an outer wall of the heating chamber 63 to inner lateral sidewalls of the combustion chamber 15 is in a range of 200 mm to 300 mm. A distance from the outer wall of the heating chamber 63 to an inner top wall of the combustion chamber 15 is in a range of 200 mm to 300 mm. A distance from the outer wall of the heating chamber 63 to an inner bottom wall of the combustion chamber 15 is in a range of 300 mm to 500 mm.

According to an embodiment of the present invention, the apparatus further includes a transmission gear ring 34 provided at an outer wall of the outlet pipe 12. The transmission gear ring 34 is operably coupled with the gearing 35. Further, the apparatus includes rolling rings 9 provided at an outer wall of the inlet pipe 8 and the outer wall of the outlet pipe 12. The rolling rings are seated on supporting rollers 10.

According to an embodiment of the present invention, the heating chamber 63 includes a plurality of rows of protrusion plates 32 configured inwardly protruding from the inner wall of the heating chamber 63. The protrusion plates 32 are arranged with an angle of 5° to 20° relative to an axial direction of the heating chamber 63. Each row of protrusion plates 32 distant from a next row for about 500 mm to 800 mm. Each row of the protrusion plates 32 includes a plurality of protrusion plates, and each of which remains a gap of 5 mm to 10 mm away from a next one. Each protrusion plate 32 has a length of 500 mm to 800 mm and a height equivalent to about 15% to 25% of the diameter of the heating chamber 63.

According to an embodiment of the present invention, the outlet pipe 12 includes a plurality of screw guiding plates 33 secured to an inner wall of the outlet pipe 12. The screw guiding plates 33 of the outlet pipe 12 define an included angle relative to an axial direction of the outlet pipe 12. The included angle of the screw guiding plates 33 of the outlet pipe 12 is about sinistral 3° to 15°. The screw guiding plates 33 of the outlet pipe 12 have a height equivalent to about 15% to 30% of a diameter of the outlet pipe 12.

According to an embodiment of the present invention, the inlet pipe 8 includes a plurality of screw guiding plates 33 secured to an inner wall of the inlet pipe 8. The screw guiding plates 33 of the inlet pipe 8 define an included angle relative to an axial direction of the inlet pipe 8. The included angle of the screw guiding plates 33 of the inlet pipe 8 is about dextral 3° to 15°. The screw guiding plates 33 of the inlet pipe 8 have a height equivalent to about 15% to 40% of a diameter of the inlet pipe 8. The inlet pipe 8 further includes a cleaning plate 65 provided between each two adjacent screw guiding plates 33. The cleaning plate 65 is positioned distant from the inner wall of the inlet pipe 8 for about 5 mm and distant from the adjacent screw guiding plates 33 for about 10 mm. Each cleaning plate 65 is secured to a rack 67. The rack 67 has an end secured to the loading conduit 36.

According to an embodiment of the present invention, the discharging chamber 1 has a discharging opening 2 configured at a bottom of the discharging chamber 1, and further includes a temperature sensor 4, a steam inlet 5, a negative pressure detection port 6, and a maintenance door 7 configured at an outer sidewall of the discharging chamber 1.

According to an embodiment of the present invention, the gas collecting chamber 20 includes a temperature sensor 4, a negative pressure detection port 6, and a maintenance door 7 configured at an outer sidewall of the gas collecting chamber 20. Further, the gas collecting chamber 20 includes an exhaust gas outlet 22 configured at the outer sidewall of the gas collecting chamber 20. According to an embodiment of the present invention, the apparatus further includes a screw conveyor 37, and a feeding storage 38. The screw conveyor 37 is provided at a top side of the gas collecting chamber 20. The feeding storage 38 is positioned over the screw conveyor 37. The gas collecting chamber 20 further includes a loading conduit 36. The loading conduit 36 has a first end connected to a discharging port of the screw conveyor 37, and a second end extending into the inlet pipe 8. The first end of the loading conduit 36 is configured penetrating through a side wall of the gas collecting chamber 20 and is further provided with a through opening 66.

According to an embodiment of the present invention, the apparatus further includes a cofferdam 21 circularly configured at an ending portion of the inlet pipe 8 along the inner wall of the inlet pipe 8 for preventing the raw material (e.g., activated coke) from backflowing when loading the raw material into the inlet pipe 8. The cofferdam 21 has an inner edge distant from an axial center of the inlet pipe 8 for about 150 mm to 250 mm. The gas collecting chamber 20 is further configured with an exhaustion opening 23 for exhausting materials exceeded from the gas collecting chamber 20.

The apparatus further includes an external fuel combustion device 24 and a gas mixture combustion device 26 provided at the sidewall of the combustion chamber 15 and the bottom of the heating chamber 63 respectively for heating the material (e.g., activated coke) inside the heating chamber 63. The external fuel combustion device 24 adopts a low pressure coal gas nozzle and consumes coal gas as fuel. The gas mixture combustion device 26 consumes the gas mixture generated by thermo-decomposition of organics during the operation of the apparatus for regenerating an activated coke, and adopts a low pressure coal gas nozzle. The temperature inside the heating chamber 63 can be controlled by adjusting the heat provided by the external fuel combustion device 24 and the gas mixture combustion device 26 to the heating chamber 63. The apparatus further includes a combustion-supporting air fan 18, an air preheating device 17, a steam superheater 60, and a chimney 19. The combustion-supporting air fan 18 is adapted for providing combustion-supporting air for the external fuel combustion device 24 and the gas mixture combustion device 26. The air preheating device 17 has an inlet and an outlet. An outlet of the combustion-supporting air fan 18 is connected with the inlet of the air preheating device 17, and the outlet of the air preheating device 17 is connected via a combustion-supporting air conduit 28 with gas inlets of the external fuel combustion device 24 and the gas mixture combustion device 26. The inlet of the air preheating device 17 is coupled with an emission opening 16 of the combustion chamber 15. The air preheating device 17 is disposed over the steam superheater 60. The outlet of the air preheating device 17 is connected to the chimney 19. Smoke generated in the combustion chamber 15 is exhausted out from the emission opening 16 of the air preheating device 17.

According to an embodiment of the present invention, the apparatus further includes a column-shaped washing tower 39, a gas transporter 52, a circulating water tank 48, and a pump 47. The column-shaped washing tower 39 has a gas inlet 42, a water outlet 41, a dreg removing opening 46 configured at a bottom side of the washing tower 39, a gas outlet 43 configured at a top side of the washing tower 39, and a water inlet 40 and a maintenance door 7 configured at an upper side of the washing tower 39. The washing tower 39 includes an annular water conduit 64. The water conduit has one end coupled to the water inlet 40 of the washing tower 39, and another end coupled with a sprayer 45. Through-hole plates 44 configured with a plurality of through-holes are provided above the annular water conduit 64 and below the sprayer 45 respectively. The gas transporter 52 includes an inlet and an outlet. The gas outlet 43 of the washing tower 39 is connected with the inlet of the gas transporter 52. The outlet of the gas transporter 52 is coupled to the inlet of the gas mixture combustion device 26 via a gas mixture conduit 27. The circulating water tank 48 includes a circulation water inlet 49 connected to the water outlet 41 of the washing tower 39, and a circulation water outlet 50 connected to a water inlet of the pump 47. The pump 47 has a water outlet coupled to the water inlet 40 of the washing tower 39.

According to an embodiment of the present invention, the combustion chamber 15 is provided with a temperature sensor 4 at an inner wall of the combustion chamber 15 for detecting a temperature inside the combustion chamber 15.

According to an embodiment of the present invention, the inner wall of the combustion chamber 15 is configured with a high-temperature refractory material 30. The combustion chamber 15 further includes a metallic housing 29, and a heat insulating material layer 31 between the inner wall and the metallic housing 29 of the combustion chamber 15.

In operation, at first, the combustion chamber 15 is heated so that a temperature inside the combustion chamber 15 reaches 150° C. to 250° C. Then, the activated coke is loaded inside the heating chamber 63. Preferably, the volume of the activated coke loaded inside the heating chamber 63 is about 20% to 40% of the volume of the heating chamber 63. Then, the combustion chamber 15 is further heated so that the temperature inside the combustion chamber 15 reaches 700° C. to 850° C. Then, the temperature remains constant and lasts for 40 to 90 minutes. Then, when the temperature inside the combustion chamber 15 reaches 600° C. to 700° C., a steam is provided inside the heating chamber 63. Preferably, the steam is provided with a rate of 0.1 to 0.5 $m^3$/(ton of activated coke).

According to an embodiment of the present invention, the apparatus further includes a steam shunting cylinder 54 having a steam inlet 57 and a steam outlet 58. The steam inlet 57 of the steam shunting cylinder 54 is connected to an external steam conduit via a valve. The steam outlet 58 of the steam shunting cylinder 54 is connected to a steam inlet of a steam flow meter 59 via a valve. The steam flow meter 59 has a steam outlet coupled to a superheated steam inlet 61 of the steam superheater 60. The steam shunting cylinder 54 is provided with a pressure gauge 55 and a drain valve 56.

According to an embodiment of the present invention, the superheated steam outlet 62 of the steam superheater 60 is coupled to a steam inlet 5 of the discharging chamber 1. The steam superheater 60 is made of high-temperature resistant stainless steel, and is assembled at an inside bottom of the combustion chamber 15 for increasing the temperature of the steam inputted into the heating chamber 63.

According to an embodiment of the present invention, the apparatus further includes a controlling cabinet 53 adapted for controlling the operation of the apparatus and monitoring the temperature inside the combustion chamber 15, adjusting the rotation speed of the heating chamber 63, and switching the rotation direction of the heating chamber 63.

According to an embodiment of the present invention, the apparatus includes a base 68, and all of the above-mentioned elements are assembled on the base 68.

Preferably, the activated coke is prepared by taking anthracite coal, lean coal, meagre coal, coking coal, rich coal, gas coal, long flame coal, brown coal, blue carbon, hard coke, or semi-coke as raw material and sequentially conducting drying, dry distillation, carbonization, and activation processes with the selected raw material. The prepared activated coke has an Iodine adsorption value in a range of 400-800 mg/g in treating the industrial wastewater and sewage. After being used in treating the industrial wastewater and sewage, the activated coke can be regenerated by the apparatus of the present invention. And after being regenerated, the Iodine adsorption value of the regenerated activated coke is equal to or greater than 400 mg/g.

When the apparatus is used for regenerating an activated coke used for treating the industrial wastewater or sewage, at first, the external fuel combustion device 24 is ignited, so that a temperature inside the combustion chamber 15 starts to increase. When the temperature inside the combustion chamber 15 reaches 150° C. to 250° C., the gearing 35 is turned on to drive the discharging chamber 1 to clockwise rotate, and at the same time the screw conveyor 37 is turned on to convey the activated coke from the feeding storage 38 via the loading conduit 36 to the inlet pipe 8. The activated coke is then transferred into the heating chamber 63 by the screw guiding plates 33, during which each cleaning plate 65 prevents two adjacent screw guiding plates 33 from being clogged by the activated coke. Then, the temperature inside the combustion chamber 15 is further raised to 700° C. to 850° C.

Then, the pump 47 is turned on. When the used activated coke is heated inside the heating chamber 63, the water content contained therein starts to evaporate and become steam. The steam then enters the inlet pipe 8, the gas collecting chamber 20 from the heating chamber 63, and is finally exhausted from the exhaust gas outlet 22. Then, the steam enters into the washing tower 39 via the inlet 42 of the washing tower 39, and flows upwardly inside the washing tower 39. The flow is uniformed by the through-hole plates 44, and flows along a reverse direction relative to a water flow sprayed from the sprayer 45. The steam is cooled and dedusted inside the washing tower 39, and is converted into condensate water, and is then provided into the circulating water tank 48 via the water outlet 41 of the washing tower 39.

When the temperature inside the combustion chamber 15 reaches 400° C. or above, organic contents contained in the activated coke starts to decompose and generate a gas mixture including carbon monoxide, nitrogen, hydrogen, carbon dioxide, steam, methane, ethane, and ethylene. The gas mixture flows via the inlet pipe 8, the gas collecting chamber 20, and is exhausted from the exhaust gas outlet 22, and enters the washing tower 39 via the inlet 42 of the washing tower 39, and flows upwardly inside the washing tower 39. The flow of the gas mixture is uniformed by the through-hole plates 44, and flows along the reverse direction relative to the water flow sprayed from the sprayer 45. The gas mixture is cooled and dedusted inside the washing tower 39, and the steam contained in gas mixture is converted into condensate water, and is then provided into the circulating water tank 48 via the water outlet 41 of the washing tower 39. Correspondingly, the rest of the gas mixture including carbon monoxide, nitrogen, hydrogen, carbon dioxide, methane, ethane, and ethylene becomes a combustible gas mixture. The combustible gas mixture is then delivered from the gas outlet 43, via the gas transporter 52, and the gas mixture conduit 27, to the gas mixture combustion device 26 of the combustion chamber 15 for combusting there. Meantime, the volume of the heat provided from the external fuel combustion device 24 can be gradually reduced in accordance with the monitored temperature inside the combustion chamber 15.

When the temperature inside the combustion chamber 15 reaches 600° C. to 700° C., the valve of the steam outlet 58 of the steam shunting cylinder 54 is switched on, and then the steam flows via the steam flow meter 59, the superheated steam inlet 61, the steam superheater 60, the superheated steam outlet 62, to the discharging chamber 1, and then flows from the discharging chamber 1 via the inlet pipe 8, and is finally inputted to the heating chamber 63. The rate of inputting the steam to the heating chamber 63 is about 0.1-0.5 $m^3$/(ton of activated coke), which can be controlled by adjusting the steam flow meter 59.

When the temperature inside the combustion chamber 15 reaches 700° C. to 850° C., the temperature is maintained constant for about 40 to 90 minutes, and then the valve of the steam outlet 58 of the steam shunting cylinder 54 is shut off. When the temperature inside the combustion chamber 15 reaches 150° C. to 400° C., the heating chamber 63 is counterclockwise rotated, viewing from the position of the discharging chamber 1. Accordingly, the material (i.e., activated coke) inside the heating chamber 63 is guided by the protrusion plates 32 and the guiding plates 14 to the outlet pipe 12, and is then driven by the screw guiding plates 33 to enter the discharging chamber 1, and is finally discharged from the discharging opening 2.

First Embodiment

In the first embodiment, the material to be regenerated is an activated coke which is fabricated by sequentially conducting drying, dry distillation, and activation processes with a blue carbon raw material, and has been used in treating wastewater in papermaking industry.

Specifically, the present invention provides an apparatus for regenerating such an activated coke. The apparatus includes a heating chamber 63, a combustion chamber 15, a gas collecting chamber 20, and a discharging chamber 1.

The heating chamber 63 is disposed inside the combustion chamber 15. The heating chamber 63 has a first end and a second end. The first end is coupled with an inlet pipe 8 and the second end is coupled with an outlet pipe 12. The inlet pipe 8 is adapted for charging the activated coke into the heating chamber 63 therethrough for regenerating, and the outlet pipe 12 is adapted for discharging the regenerated activated coke out from the heating chamber 63 therethrough. The outlet pipe 12 is connected to the discharging chamber 1, and a sealing device 11 is provided for sealing a connection configured between the discharging chamber 1 and the outlet pipe 12. The sealing device 11 is a carbon seal ring. The inlet pipe 8 is connected to the gas collecting chamber 8, and a sealing device 11 is provided for sealing a connection configured between the gas collecting chamber 20 and the inlet pipe 8. The sealing device 11 is a carbon seal ring. The heating chamber 63 has a length-diameter ratio of 8:1. Preferably, the length of the heating chamber 63 is 4.8 meter, and the diameter of the heating chamber 63 is 0.6 meter. The inlet pipe 8 has a length of 0.5 meter and a diameter of 300 mm. The outlet pipe 12 has a length of 1 meter, and a diameter of 300 mm. The heating chamber 63 is rotatable relative to the combustion chamber 51. The outlet pipe 12 is adapted to be driven by a gearing 35 to rotate, and correspondingly the outlet pipe 12 carries the heating chamber 63 to rotate together with the outlet pipe 12 with a rotation speed of 2-5 r/min.

The second end of the heating chamber 63 is configured with a cone shape 13 for coupling with the outlet pipe 12. The cone shape 13 of the second end of the heating chamber 63 has a horizontal extending length of 100 mm. The cone shape 13 of the second end further includes a guiding plate 14 provided therein for guiding the activated coke to move toward a predetermined direction.

A distance from an outer wall of the heating chamber 63 to inner lateral sidewalls of the combustion chamber 15 is 200 mm. A distance from the outer wall of the heating chamber 63 to an inner top wall of the combustion chamber 15 is 200 mm. A distance from the outer wall of the heating chamber 63 to an inner bottom wall of the combustion chamber 15 is 300 mm. The heating chamber 63 includes an inner wall being in direct contact with the activated coke.

The apparatus further includes a transmission gear ring 34 provided at an outer wall of the outlet pipe 12. The transmission gear ring 34 is operably coupled with the gearing 35. Further, the apparatus includes rolling rings 9 provided at an outer wall of the inlet pipe 8 and the outer wall of the outlet pipe 12. The rolling rings are seated on supporting rollers 10.

The heating chamber 63 includes a plurality of rows of protrusion plates 32 configured inwardly protruding from the inner wall of the heating chamber 63. The protrusion plates 32 are arranged with an angle of 5° relative to an axial direction of the heating chamber 63. Each row of protrusion plates 32 distant from a next row for about 500 mm. Each row of the protrusion plates 32 includes a plurality of protrusion plates, and each of which remains a gap of about 5 mm away from a next one. Each protrusion plate 32 has a length of 500 mm and a height equivalent to about 15% of the diameter of the heating chamber 63.

The outlet pipe 12 includes a plurality of screw guiding plates 33 secured to an inner wall of the outlet pipe 12. The screw guiding plates 33 of the outlet pipe 12 define an included angle relative to an axial direction of the outlet pipe 12. The included angle of the screw guiding plates 33 of the outlet pipe 12 is about sinistral 3°. The screw guiding plates 33 of the outlet pipe 12 have a height equivalent to about 15% of a diameter of the outlet pipe 12.

The inlet pipe 8 includes a plurality of screw guiding plates 33 secured to an inner wall of the inlet pipe 8. The screw guiding plates 33 of the inlet pipe 8 define an included angle relative to an axial direction of the inlet pipe 8. The included angle of the screw guiding plates 33 of the inlet pipe 8 is about dextral 3°. The screw guiding plates 33 of the inlet pipe 8 have a height equivalent to about 15% of a diameter of the inlet pipe 8. The inlet pipe 8 further includes a cleaning plate 65 provided between each two adjacent screw guiding plates 33. The cleaning plate 65 is positioned distant from the inner wall of the inlet pipe 8 for about 5 mm and distant from the adjacent screw guiding plates 33 for about 10 mm. Each cleaning plate 65 is secured to a rack 67. The rack 67 has an end secured to the loading conduit 36.

According to an aspect of the embodiment of the present invention, the discharging chamber 1 has a discharging opening 2 configured at a bottom of the discharging chamber 1, and further includes a temperature sensor 4, a steam inlet 5, a negative pressure detection port 6, and a maintenance door 7 configured at an outer sidewall of the discharging chamber 1.

Further, the gas collecting chamber 20 includes a temperature sensor 4, a negative pressure detection port 6, and a maintenance door 7 configured at an outer sidewall of the gas collecting chamber 20. Furthermore, the gas collecting chamber 20 includes an exhaust gas outlet 22 configured at the outer sidewall of the gas collecting chamber 20. The apparatus further includes a screw conveyor 37, and a feeding storage 38. The screw conveyor 37 is provided at a top side of the gas collecting chamber 20. The feeding storage 38 is positioned over the screw conveyor 37. The gas collecting chamber 20 further includes a loading conduit 36. The loading conduit 36 has a first end connected to a discharging port of the screw conveyor 37, and a second end extending into the inlet pipe 8. The first end of the loading conduit 36 is configured penetrating through a side wall of the gas collecting chamber 20 and is further provided with a through opening 66.

The apparatus further includes a cofferdam 21 circularly configured at an ending portion of the inlet pipe 8 along the inner wall of the inlet pipe 8 for preventing the raw material (e.g., activated coke) from backflowing when loading the raw material into the inlet pipe 8 when loading the raw material into the inlet pipe 8. The cofferdam 21 has an inner edge distant from an axial center of the inlet pipe 8 for about 150 mm.

The gas collecting chamber 20 is further configured with an exhaustion opening 23 for exhausting materials exceeded from the gas collecting chamber 20.

The apparatus further includes an external fuel combustion device 24 and a gas mixture combustion device 26 provided at the sidewall of the combustion chamber 15 and the bottom of the heating chamber 63 respectively for heating the material (e.g., activated coke) inside the heating chamber 63. The external fuel combustion device 24 adopts a low pressure coal gas nozzle and consumes coal gas as fuel. The gas mixture combustion device 26 consumes the gas mixture generated by thermo-decomposition of organics during the operation of the apparatus for regenerating an activated coke, and adopts a low pressure coal gas nozzle. The temperature inside the heating chamber 63 can be controlled by adjusting the heat provided by the external fuel combustion device 24 and the gas mixture combustion device 26 to the heating chamber 63. The apparatus further includes a combustion-supporting air fan 18, an air preheating device 17, a steam superheater 60, and a chimney 19. The combustion-supporting air fan 18 is adapted for providing combustion-supporting air for the external fuel combustion device 24 and the gas mixture combustion device 26. The air preheating device 17 has an inlet and an outlet. An outlet of the combustion-supporting air fan 18 is connected with the inlet of the air preheating device 17, and the outlet of the air preheating device 17 is connected via a combustion-supporting air conduit 28 with gas inlets of the external fuel combustion device 24 and the gas mixture combustion device 26. The inlet of the air preheating device 17 is coupled with an emission opening 16 of the combustion chamber 15. The air preheating device 17 is disposed over the steam superheater 60. The outlet of the air preheating device 17 is connected to the chimney 19. Smoke generated in the combustion chamber 15 is exhausted out from the emission opening 16 of the air preheating device 17.

The apparatus further includes a column-shaped washing tower 39, a gas transporter 52, a circulating water tank 48, and a pump 47. The column-shaped washing tower 39 has a gas inlet 42, a water outlet 41, a dreg removing opening 46 configured at a bottom side of the washing tower 39, a gas outlet 43 configured at a top side of the washing tower 39, and a water inlet 40 and a maintenance door 7 configured at an upper side of the washing tower 39. The washing tower 39 includes an annular water conduit 64. The water conduit has one end coupled to the water inlet 40 of the washing tower 39, and another end coupled with a sprayer 45. Through-hole plates 44 configured with a plurality of through-holes are provided above the annular water conduit 64 and below the sprayer 45 respectively. The gas transporter 52 includes an inlet and an outlet. The gas outlet 43 of the washing tower 39 is connected with the inlet of the gas transporter 52. The outlet of the gas transporter 52 is coupled to the inlet of the gas mixture combustion device 26 via a gas mixture conduit 27. The circulating water tank 48 includes a circulation water inlet 49 connected to the water outlet 41 of the washing tower 39, and a circulation water outlet 50 connected to a water inlet of the pump 47. The pump 47 has a water outlet coupled to the water inlet 40 of the washing tower 39.

The combustion chamber 15 is provided with a temperature sensor 4 at an inner wall of the combustion chamber 15 for detecting a temperature inside the combustion chamber 15.

According to an aspect of the embodiment of the present invention, the inner wall of the combustion chamber 15 is configured with a high-temperature refractory material 30. The high-temperature refractory material 30 is configured with light weight high alumina bricks and high alumina fibers. The roof of the combustion chamber 15 is configured with casting with an alumino-silicate fiber material. The combustion chamber 15 further includes a metallic housing 29, and a heat insulating material layer 31 between the inner wall and the metallic housing 29 of the combustion chamber 15. Preferably, the heat insulating material layer 31 is a glass fiber plate.

In operation, when the combustion chamber 15 is heated so that a temperature inside the combustion chamber 15 reaches 150° C., the activated coke is loaded inside the heating chamber 63. Preferably, the volume of the activated coke loaded inside the heating chamber 63 is about 40% of the volume of the heating chamber 63. Then, when the combustion chamber 15 is further heated so that the temperature inside the combustion chamber 15 reaches 700° C., the temperature remains constant and lasts for 90 minutes at 700° C. Then, when the temperature inside the combustion chamber 15 reaches 600° C., a steam is provided inside the heating chamber 63. Preferably, the steam is provided with a rate of 0.5 m$^3$/(ton of activated coke).

The apparatus further includes a steam shunting cylinder 54 having a steam inlet 57 and a steam outlet 58. The steam inlet 57 of the steam shunting cylinder 54 is connected to an external steam conduit via a valve. The steam outlet 58 of the steam shunting cylinder 54 is connected to a steam inlet of a steam flow meter 59 via a valve. The steam flow meter 59 has a steam outlet coupled to a superheated steam inlet 61 of the steam superheater 60. The steam shunting cylinder 54 is provided with a pressure gauge 55 and a drain valve 56.

The superheated steam outlet 62 of the steam superheater 60 is coupled to a steam inlet 5 of the discharging chamber 1. The steam superheater 60 is made of high-temperature resistant stainless steel, and is assembled at an inside bottom of the combustion chamber 15 for increasing the temperature of the steam inputted into the heating chamber 63.

The apparatus further includes a controlling cabinet 53 adapted for controlling the operation of the apparatus and monitoring the temperature inside the combustion chamber 15, adjusting the rotation speed of the heating chamber 63, and switching the rotation direction of the heating chamber 63. The apparatus includes a base 68, and all of the above-mentioned elements are assembled on the base 68.

In the first embodiment of the present invention, the activated coke is prepared by sequentially conducting drying, dry distillation, and activation processes with the selected raw material, i.e., blue carbon.

The prepared activated coke has an Iodine adsorption value of 400 mg/g in treating the industrial wastewater.

After being used in treating the industrial wastewater and sewage, the Iodine adsorption value of the activated coke decreases to 219 mg/g.

After being regenerated by the apparatus of the present invention, the Iodine adsorption value of the regenerated activated coke is equal to or greater than 413 mg/g.

When the apparatus is used for regenerating an activated coke used for treating the industrial wastewater or sewage, at first, the external fuel combustion device 24 is ignited, so that a temperature inside the combustion chamber 15 starts to increase. When the temperature inside the combustion chamber 15 reaches 150° C., the gearing 35 is turned on to drive the discharging chamber 1 to clockwise rotate, and at the same time the screw conveyor 37 is turned on to convey the activated coke from the feeding storage 38 via the loading conduit 36 to the inlet pipe 8. The activated coke is then transferred into the heating chamber 63 by the screw guiding plates 33, during which each cleaning plate 65 prevents two adjacent screw guiding plates 33 from being clogged by the activated coke. The temperature inside the combustion chamber 15 is further raised to 700° C.

Then, the pump 47 is turned on. When the used activated coke is heated inside the heating chamber 63, the water content contained therein starts to evaporate and become steam. The steam then enters the inlet pipe 8, the gas collecting chamber 20 from the heating chamber 63, and is finally exhausted from the exhaust gas outlet 22. Then, the steam enters into the washing tower 39 via the inlet 42 of the washing tower 39, and flows upwardly inside the washing tower 39. The flow is uniformed by the through-hole plates 44, and flows along a reverse direction relative to a water flow sprayed from the sprayer 45. The steam is cooled and dedusted inside the washing tower 39, and is converted into condensate water, and is then provided into the circulating water tank 48 via the water outlet 41 of the washing tower 39.

When the temperature inside the combustion chamber 15 reaches 400° C. or above, organic contents contained in the activated coke starts to decompose and generate a gas mixture including carbon monoxide, nitrogen, hydrogen, carbon dioxide, steam, methane, ethane, and ethylene. The gas mixture flows via the inlet pipe 8, the gas collecting chamber 20, and is exhausted from the exhaust gas outlet 22, and enters the washing tower 39 via the inlet 42 of the washing tower 39, and flows upwardly inside the washing tower 39. The flow of the gas mixture is uniformed by the through-hole plates 44, and flows along the reverse direction relative to the water flow sprayed from the sprayer 45. The gas mixture is cooled and dedusted inside the washing tower 39, and the steam contained in gas mixture is converted into condensate water, and is then provided into the circulating water tank 48 via the water outlet 41 of the washing tower 39. Correspondingly, the rest of the gas mixture including carbon monoxide, nitrogen, hydrogen, carbon dioxide, methane, ethane, and ethylene becomes a combustible gas mixture. The combustible gas mixture is then delivered from the gas outlet 43, via the gas transporter 52, and the gas mixture conduit 27, to the gas mixture combustion device 26 of the combustion chamber 15 for combusting there. Meantime, the volume of the heat provided from the external fuel combustion device 24 can be gradually reduced in accordance with the monitored temperature inside the combustion chamber 15.

When the temperature inside the combustion chamber 15 reaches 600° C., the valve of the steam outlet 58 of the steam shunting cylinder 54 is switched on, and then the steam flows via the steam flow meter 59, the superheated steam inlet 61, the steam superheater 60, the superheated steam outlet 62, to the discharging chamber 1, and then flows from the discharging chamber 1 via the inlet pipe 8, and is finally inputted to the heating chamber 63. The rate of inputting the steam to the heating chamber 63 is about 0.5 $m^3$/(ton of activated coke), which can be controlled by adjusting the steam flow meter 59.

When the temperature inside the combustion chamber 15 reaches 700° C., the temperature is maintained constant for about 90 minutes, and then the valve of the steam outlet 58 of the steam shunting cylinder 54 is shut off. When there is no gas mixture exhausted out from the heating chamber 53 and when the temperature inside the combustion chamber 15 decreases to 150° C., the heating chamber 63 is counterclockwise rotated, viewing from the position of the discharging chamber 1. Accordingly, the material (i.e., activated coke) inside the heating chamber 63 is guided by the protrusion plates 32 and the guiding plates 14 to the outlet pipe 12, and is then driven by the screw guiding plates 33 to enter the discharging chamber 1, and is finally discharged from the discharging opening 2.

Second Embodiment

In the second embodiment, the material to be regenerated is an activated coke which is fabricated by sequentially conducting drying, dry distillation, and activation processes with a hard coke raw material, and has been used in treating wastewater in pharmaceutical industry.

Specifically, the present invention provides an apparatus for regenerating such an activated coke. The apparatus includes a heating chamber 63, a combustion chamber 15, a gas collecting chamber 20, and a discharging chamber 1.

The heating chamber 63 is disposed inside the combustion chamber 15. The heating chamber 63 has a first end and a second end. The first end is coupled with an inlet pipe 8 and the second end is coupled with an outlet pipe 12. The inlet pipe 8 is adapted for charging the activated coke into the heating chamber 63 therethrough for regenerating, and the outlet pipe 12 is adapted for discharging the regenerated activated coke out from the heating chamber 63 therethrough. The outlet pipe 12 is connected to the discharging chamber 1, and a sealing device 11 is provided for sealing a connection configured between the discharging chamber 1 and the outlet pipe 12. The sealing device 11 is a carbon seal ring. The inlet pipe 8 is connected to the gas collecting chamber 8, and a sealing device 11 is provided for sealing a connection configured between the gas collecting chamber 20 and the inlet pipe 8. The sealing device 11 is a carbon seal ring. The heating chamber 63 has a length-diameter ratio of 6:1. Preferably, the length of the heating chamber 63 is 6 meter, and the diameter of the heating chamber 63 is 1 meter. The inlet pipe 8 has a length of 1 meter and a diameter of 600 mm. The outlet pipe 12 has a length of 1.5 meter, and a diameter of 600 mm. The heating chamber 63 is rotatable relative to the combustion chamber 51. The outlet pipe 12 is adapted to be driven by a gearing 35 to rotate, and correspondingly the outlet pipe 12 carries the heating chamber 63 to rotate together with the outlet pipe 12 with a rotation speed of 2-5 r/min.

The second end of the heating chamber 63 is configured with a cone shape 13 for coupling with the outlet pipe 12. The cone shape 13 of the second end of the heating chamber 63 has a horizontal extending length of 50 mm. The cone shape 13 of the second end further includes a guiding plate 14 provided therein for guiding the activated coke to move toward a predetermined direction.

A distance from an outer wall of the heating chamber 63 to inner lateral sidewalls of the combustion chamber 15 is 300 mm. A distance from the outer wall of the heating chamber 63 to an inner top wall of the combustion chamber 15 is 300 mm. A distance from the outer wall of the heating chamber 63 to an inner bottom wall of the combustion chamber 15 is 500 mm. The heating chamber 63 includes an inner wall being in direct contact with the activated coke.

The apparatus further includes a transmission gear ring 34 provided at an outer wall of the outlet pipe 12. The transmission gear ring 34 is operably coupled with the gearing 35. Further, the apparatus includes rolling rings 9 provided at an outer wall of the inlet pipe 8 and the outer wall of the outlet pipe 12. The rolling rings are seated on supporting rollers 10.

The heating chamber 63 includes a plurality of rows of protrusion plates 32 configured inwardly protruding from the inner wall of the heating chamber 63. The protrusion plates 32 are arranged with an angle of 20° relative to an axial direction of the heating chamber 63. Each row of protrusion plates 32 distant from a next row for about 800 mm. Each row of the protrusion plates 32 includes a plurality of protrusion plates, and each of which remains a gap of about 10 mm away from a next one. Each protrusion plate 32 has a length of 500 mm and a height equivalent to about 25% of the diameter of the heating chamber 63.

The outlet pipe 12 includes a plurality of screw guiding plates 33 secured to an inner wall of the outlet pipe 12. The screw guiding plates 33 of the outlet pipe 12 define an included angle relative to an axial direction of the outlet pipe 12. The included angle of the screw guiding plates 33 of the outlet pipe 12 is about sinistral 15°. The screw guiding plates 33 of the outlet pipe 12 have a height equivalent to about 30% of a diameter of the outlet pipe 12.

The inlet pipe 8 includes a plurality of screw guiding plates 33 secured to an inner wall of the inlet pipe 8. The screw guiding plates 33 of the inlet pipe 8 define an included angle relative to an axial direction of the inlet pipe 8. The included angle of the screw guiding plates 33 of the inlet pipe 8 is about dextral 15°. The screw guiding plates 33 of the inlet pipe 8 have a height equivalent to about 40% of a diameter of the inlet pipe 8. The inlet pipe 8 further includes a cleaning plate 65 provided between each two adjacent screw guiding plates 33. The cleaning plate 65 is positioned distant from the inner wall of the inlet pipe 8 for about 5 mm and distant from the adjacent screw guiding plates 33 for about 10 mm. Each cleaning plate 65 is secured to a rack 67. The rack 67 has an end secured to the loading conduit 36.

According to an aspect of the embodiment of the present invention, the discharging chamber 1 has a discharging opening 2 configured at a bottom of the discharging chamber 1, and further includes a temperature sensor 4, a steam inlet 5, a negative pressure detection port 6, and a maintenance door 7 configured at an outer sidewall of the discharging chamber 1.

Further, the gas collecting chamber 20 includes a temperature sensor 4, a negative pressure detection port 6, and a maintenance door 7 configured at an outer sidewall of the gas collecting chamber 20. Furthermore, the gas collecting chamber 20 includes an exhaust gas outlet 22 configured at the outer sidewall of the gas collecting chamber 20. The apparatus further includes a screw conveyor 37, and a feeding storage 38. The screw conveyor 37 is provided at a top side of the gas collecting chamber 20. The feeding storage 38 is positioned over the screw conveyor 37. The gas collecting chamber 20 further includes a loading conduit 36. The loading conduit 36 has a first end connected to a discharging port of the screw conveyor 37, and a second end extending into the inlet pipe 8. The first end of the loading conduit 36 is configured penetrating through a side wall of the gas collecting chamber 20 and is further provided with a through opening 66.

The apparatus further includes a cofferdam 21 circularly configured at an ending portion of the inlet pipe 8 along the inner wall of the inlet pipe 8 for preventing the raw material (e.g., activated coke) from backflowing when loading the raw material into the inlet pipe 8 when loading the raw material into the inlet pipe 8. The cofferdam 21 has an inner edge distant from an axial center of the inlet pipe 8 for about 250 mm.

The gas collecting chamber 20 is further configured with an exhaustion opening 23 for exhausting materials exceeded from the gas collecting chamber 20.

The apparatus further includes an external fuel combustion device 24 and a gas mixture combustion device 26 provided at the sidewall of the combustion chamber 15 and the bottom of the heating chamber 63 respectively for heating the material (e.g., activated coke) inside the heating chamber 63. The external fuel combustion device 24 adopts a low pressure coal gas nozzle and consumes coal gas as fuel. The gas mixture combustion device 26 consumes the gas mixture generated by thermo-decomposition of organics during the operation of the apparatus for regenerating an activated coke, and adopts a low pressure coal gas nozzle. The temperature inside the heating chamber 63 can be controlled by adjusting the heat provided by the external fuel combustion device 24 and the gas mixture combustion device 26 to the heating chamber 63. The apparatus further includes a combustion-supporting air fan 18, an air preheating device 17, a steam superheater 60, and a chimney 19. The combustion-supporting air fan 18 is adapted for providing combustion-supporting air for the external fuel combustion device 24 and the gas mixture combustion device 26. The air preheating device 17 has an inlet and an outlet. An outlet of the combustion-supporting air fan 18 is connected with the inlet of the air preheating device 17, and the outlet of the air preheating device 17 is connected via a combustion-supporting air conduit 28 with gas inlets of the external fuel combustion device 24 and the gas mixture combustion device 26. The inlet of the air preheating device 17 is coupled with an emission opening 16 of the combustion chamber 15. The air preheating device 17 is disposed over the steam superheater 60. The outlet of the air preheating device 17 is connected to the chimney 19. Smoke generated in the combustion chamber 15 is exhausted out from the emission opening 16 of the air preheating device 17.

The apparatus further includes a column-shaped washing tower 39, a gas transporter 52, a circulating water tank 48, and a pump 47. The column-shaped washing tower 39 has a gas inlet 42, a water outlet 41, a dreg removing opening 46 configured at a bottom side of the washing tower 39, a gas outlet 43 configured at a top side of the washing tower 39, and a water inlet 40 and a maintenance door 7 configured at an upper side of the washing tower 39. The washing tower 39 includes an annular water conduit 64. The water conduit has one end coupled to the water inlet 40 of the washing tower 39, and another end coupled with a sprayer 45. Through-hole plates 44 configured with a plurality of through-holes are provided above the annular water conduit 64 and below the sprayer 45 respectively. The gas transporter 52 includes an inlet and an outlet. The gas outlet 43 of the washing tower 39 is connected with the inlet of the gas transporter 52. The outlet of the gas transporter 52 is coupled to the inlet of the gas mixture combustion device 26 via a gas mixture conduit 27. The circulating water tank 48 includes a circulation water inlet 49 connected to the water outlet 41 of the washing tower 39, and a circulation water outlet 50 connected to a water inlet of the pump 47. The pump 47 has a water outlet coupled to the water inlet 40 of the washing tower 39.

The combustion chamber 15 is provided with a temperature sensor 4 at an inner wall of the combustion chamber 15 for detecting a temperature inside the combustion chamber 15.

According to an aspect of the second embodiment of the present invention, the inner wall of the combustion chamber 15 is configured with a light weight steel skeleton provided with a high-temperature refractory material 30. The high-temperature refractory material 30 is configured with alumino-silicate fiber plates. The combustion chamber 15 further includes a metallic housing 29, and a heat insulating material layer 31 between the inner wall and the metallic housing 29 of the combustion chamber 15. Preferably, the heat insulating material layer 31 is a glass fiber plate.

In operation, when the combustion chamber 15 is heated so that a temperature inside the combustion chamber 15 reaches 250° C., the activated coke is loaded inside the heating chamber 63. Preferably, the volume of the activated coke loaded inside the heating chamber 63 is about 20% of the volume of the heating chamber 63. Then, when the combustion chamber 15 is further heated so that the temperature inside the combustion chamber 15 reaches 850° C., the temperature remains constant and lasts for 40 minutes at 850° C. Then, when the temperature inside the combustion chamber 15 reaches 700° C., a steam is provided inside the heating chamber 63. Preferably, the steam is provided with a rate of 0.1 m$^3$/(ton of activated coke).

The apparatus further includes a steam shunting cylinder 54 having a steam inlet 57 and a steam outlet 58. The steam inlet 57 of the steam shunting cylinder 54 is connected to an external steam conduit via a valve. The steam outlet 58 of the steam shunting cylinder 54 is connected to a steam inlet of a steam flow meter 59 via a valve. The steam flow meter 59 has a steam outlet coupled to a superheated steam inlet 61 of the steam superheater 60. The steam shunting cylinder 54 is provided with a pressure gauge 55 and a drain valve 56.

The superheated steam outlet 62 of the steam superheater 60 is coupled to a steam inlet 5 of the discharging chamber 1. The steam superheater 60 is made of high-temperature resistant stainless steel, and is assembled at an inside bottom of the combustion chamber 15 for increasing the temperature of the steam inputted into the heating chamber 63.

The apparatus further includes a controlling cabinet 53 adapted for controlling the operation of the apparatus and monitoring the temperature inside the combustion chamber 15, adjusting the rotation speed of the heating chamber 63, and switching the rotation direction of the heating chamber 63. The apparatus includes a base 68, and all of the above-mentioned elements are assembled on the base 68.

In the second embodiment of the present invention, the activated coke is prepared by sequentially conducting drying, dry distillation, and activation processes with the selected raw material, i.e., hard coke.

The prepared activated coke has an Iodine adsorption value of 800 mg/g in treating the industrial wastewater and sewage.

After being used in treating the industrial wastewater, the Iodine adsorption value of the activated coke decreases to 473 mg/g.

After being regenerated by the apparatus of the present invention, the Iodine adsorption value of the regenerated activated coke is equal to or greater than 780 mg/g.

When the apparatus is used for regenerating an activated coke used for treating the industrial wastewater or sewage, at first, the external fuel combustion device 24 is ignited, so that a temperature inside the combustion chamber 15 starts to increase. When the temperature inside the combustion chamber 15 reaches 250° C., the gearing 35 is turned on to drive the discharging chamber 1 to clockwise rotate, and at the same time the screw conveyor 37 is turned on to convey the activated coke from the feeding storage 38 via the loading conduit 36 to the inlet pipe 8. The activated coke is then transferred into the heating chamber 63 by the screw guiding plates 33, during which each cleaning plate 65 prevents two adjacent screw guiding plates 33 from being clogged by the activated coke. The temperature inside the combustion chamber 15 is further raised to 700° C.

Then, the pump 47 is turned on. When the used activated coke is heated inside the heating chamber 63, the water content contained therein starts to evaporate and become steam. The steam then enters the inlet pipe 8, the gas collecting chamber 20 from the heating chamber 63, and is finally exhausted from the exhaust gas outlet 22. Then, the steam enters into the washing tower 39 via the inlet 42 of the washing tower 39, and flows upwardly inside the washing tower 39. The flow is uniformed by the through-hole plates 44, and flows along a reverse direction relative to a water flow sprayed from the sprayer 45. The steam is cooled and dedusted inside the washing tower 39, and is converted into condensate water, and is then provided into the circulating water tank 48 via the water outlet 41 of the washing tower 39.

When the temperature inside the combustion chamber 15 reaches 400° C. or above, organic contents contained in the activated coke starts to decompose and generate a gas mixture including carbon monoxide, nitrogen, hydrogen, carbon dioxide, steam, methane, ethane, and ethylene. The gas mixture flows via the inlet pipe 8, the gas collecting chamber 20, and is exhausted from the exhaust gas outlet 22, and enters the washing tower 39 via the inlet 42 of the washing tower 39, and flows upwardly inside the washing tower 39. The flow of the gas mixture is uniformed by the through-hole plates 44, and flows along the reverse direction relative to the water flow sprayed from the sprayer 45. The gas mixture is cooled and dedusted inside the washing tower 39, and the steam contained in gas mixture is converted into condensate water, and is then provided into the circulating water tank 48 via the water outlet 41 of the washing tower 39. Correspondingly, the rest of the gas mixture including carbon monoxide, nitrogen, hydrogen, carbon dioxide, methane, ethane, and ethylene becomes a combustible gas mixture. The combustible gas mixture is then delivered from the gas outlet 43, via the gas transporter 52, and the gas mixture conduit 27, to the gas mixture combustion device 26 of the combustion chamber 15 for combusting there. Meantime, the volume of the heat provided from the external fuel combustion device 24 can be gradually reduced in accordance with the monitored temperature inside the combustion chamber 15.

When the temperature inside the combustion chamber 15 reaches 600° C., the valve of the steam outlet 58 of the steam shunting cylinder 54 is switched on, and then the steam flows via the steam flow meter 59, the superheated steam inlet 61, the steam superheater 60, the superheated steam outlet 62, to the discharging chamber 1, and then flows from the discharging chamber 1 via the inlet pipe 8, and is finally inputted to the heating chamber 63. The rate of inputting the steam to the heating chamber 63 is about 0.1 m$^3$/(ton of activated coke), which can be controlled by adjusting the steam flow meter 59.

When the temperature inside the combustion chamber 15 reaches 700° C., the temperature is maintained constant for about 90 minutes, and then the valve of the steam outlet 58 of the steam shunting cylinder 54 is shut off. When there is no gas mixture exhausted out from the heating chamber 53 and when the temperature inside the combustion chamber 15 decreases to 150° C., the heating chamber 63 is counter-clockwise rotated, viewing from the position of the discharging chamber 1. Accordingly, the material (i.e., activated coke) inside the heating chamber 63 is guided by the protrusion plates 32 and the guiding plates 14 to the outlet pipe 12, and is then driven by the screw guiding plates 33 to enter the discharging chamber 1, and is finally discharged from the discharging opening 2.

Third Embodiment

In the third embodiment, the material to be regenerated is an activated coke which is fabricated by sequentially conducting drying, dry distillation, and activation processes with a semi-coke raw material, and has been used in treating municipal sewage.

Specifically, the present invention provides an apparatus for regenerating such an activated coke. The apparatus includes a heating chamber 63, a combustion chamber 15, a gas collecting chamber 20, and a discharging chamber 1.

The heating chamber 63 is disposed inside the combustion chamber 15. The heating chamber 63 has a first end and a second end. The first end is coupled with an inlet pipe 8 and the second end is coupled with an outlet pipe 12. The inlet pipe 8 is adapted for charging the activated coke into the heating chamber 63 therethrough for regenerating, and the outlet pipe 12 is adapted for discharging the regenerated activated coke out from the heating chamber 63 therethrough. The outlet pipe 12 is connected to the discharging chamber 1, and a sealing device 11 is provided for sealing a connection configured between the discharging chamber 1 and the outlet pipe 12. The sealing device 11 is a carbon seal ring. The inlet pipe 8 is connected to the gas collecting chamber 8, and a sealing device 11 is provided for sealing a connection configured between the gas collecting chamber 20 and the inlet pipe 8. The sealing device 11 is a carbon seal ring. The heating chamber 63 has a length-diameter ratio of 7:1. Preferably, the length of the heating chamber 63 is 5.6 meter, and the diameter of the heating chamber 63 is 0.8 meter. The inlet pipe 8 has a length of 0.7 meter and a diameter of 450 mm. The outlet pipe 12 has a length of 1.2 meter, and a diameter of 450 mm. The heating chamber 63 is rotatable relative to the combustion chamber 51. The outlet pipe 12 is adapted to be driven by a gearing 35 to rotate, and correspondingly the outlet pipe 12 carries the heating chamber 63 to rotate together with the outlet pipe 12 with a rotation speed of 2-5 r/min.

The second end of the heating chamber 63 is configured with a cone shape 13 for coupling with the outlet pipe 12. The cone shape 13 of the second end of the heating chamber 63 has a horizontal extending length of 300 mm. The cone shape 13 of the second end further includes a guiding plate 14 provided therein for guiding the activated coke to move toward a predetermined direction.

A distance from an outer wall of the heating chamber 63 to inner lateral sidewalls of the combustion chamber 15 is 250 mm. A distance from the outer wall of the heating chamber 63 to an inner top wall of the combustion chamber 15 is 250 mm. A distance from the outer wall of the heating chamber 63 to an inner bottom wall of the combustion chamber 15 is 400 mm. The heating chamber 63 includes an inner wall being in direct contact with the activated coke.

The apparatus further includes a transmission gear ring 34 provided at an outer wall of the outlet pipe 12. The transmission gear ring 34 is operably coupled with the gearing 35. Further, the apparatus includes rolling rings 9 provided at an outer wall of the inlet pipe 8 and the outer wall of the outlet pipe 12. The rolling rings are seated on supporting rollers 10.

The heating chamber 63 includes a plurality of rows of protrusion plates 32 configured inwardly protruding from the inner wall of the heating chamber 63. The protrusion plates 32 are arranged with an angle of 10° relative to an axial direction of the heating chamber 63. Each row of protrusion plates 32 distant from a next row for about 600 mm. Each row of the protrusion plates 32 includes a plurality of protrusion plates, and each of which remains a gap of about 8 mm away from a next one. Each protrusion plate 32 has a length of 600 mm and a height equivalent to about 20% of the diameter of the heating chamber 63.

The outlet pipe 12 includes a plurality of screw guiding plates 33 secured to an inner wall of the outlet pipe 12. The screw guiding plates 33 of the outlet pipe 12 define an included angle relative to an axial direction of the outlet pipe 12. The included angle of the screw guiding plates 33 of the outlet pipe 12 is about sinistral 8°. The screw guiding plates 33 of the outlet pipe 12 have a height equivalent to about 20% of a diameter of the outlet pipe 12.

The inlet pipe 8 includes a plurality of screw guiding plates 33 secured to an inner wall of the inlet pipe 8. The screw guiding plates 33 of the inlet pipe 8 define an included angle relative to an axial direction of the inlet pipe 8. The included angle of the screw guiding plates 33 of the inlet pipe 8 is about dextral 10°. The screw guiding plates 33 of the inlet pipe 8 have a height equivalent to about 25% of a diameter of the inlet pipe 8. The inlet pipe 8 further includes a cleaning plate 65 provided between each two adjacent screw guiding plates 33. The cleaning plate 65 is positioned distant from the inner wall of the inlet pipe 8 for about 5 mm and distant from the adjacent screw guiding plates 33 for about 10 mm. Each cleaning plate 65 is secured to a rack 67. The rack 67 has an end secured to the loading conduit 36.

According to an aspect of the embodiment of the present invention, the discharging chamber 1 has a discharging opening 2 configured at a bottom of the discharging chamber 1, and further includes a temperature sensor 4, a steam inlet 5, a negative pressure detection port 6, and a maintenance door 7 configured at an outer sidewall of the discharging chamber 1.

Further, the gas collecting chamber 20 includes a temperature sensor 4, a negative pressure detection port 6, and a maintenance door 7 configured at an outer sidewall of the gas collecting chamber 20. Furthermore, the gas collecting chamber 20 includes an exhaust gas outlet 22 configured at the outer sidewall of the gas collecting chamber 20. The apparatus further includes a screw conveyor 37, and a feeding storage 38. The screw conveyor 37 is provided at a top side of the gas collecting chamber 20. The feeding storage 38 is positioned over the screw conveyor 37. The gas collecting chamber 20 further includes a loading conduit 36. The loading conduit 36 has a first end connected to a discharging port of the screw conveyor 37, and a second end extending into the inlet pipe 8. The first end of the loading conduit 36 is configured penetrating through a side wall of the gas collecting chamber 20 and is further provided with a through opening 66.

The apparatus further includes a cofferdam 21 circularly configured at an ending portion of the inlet pipe 8 along the inner wall of the inlet pipe 8 for preventing the raw material (e.g., activated coke) from backflowing when loading the raw material into the inlet pipe 8 when loading the raw material into the inlet pipe 8. The cofferdam 21 has an inner edge distant from an axial center of the inlet pipe 8 for about 200 mm.

The gas collecting chamber 20 is further configured with an exhaustion opening 23 for exhausting materials exceeded from the gas collecting chamber 20.

The apparatus further includes an external fuel combustion device 24 and a gas mixture combustion device 26 provided at the sidewall of the combustion chamber 15 and the bottom of the heating chamber 63 respectively for heating the material (e.g., activated coke) inside the heating chamber 63. The external fuel combustion device 24 adopts a low pressure coal gas nozzle and consumes coal gas as fuel. The gas mixture combustion device 26 consumes the gas mixture generated by thermo-decomposition of organics during the operation of the apparatus for regenerating an activated coke, and adopts a low pressure coal gas nozzle. The temperature inside the heating chamber 63 can be controlled by adjusting the heat provided by the external fuel combustion device 24 and the gas mixture combustion device 26 to the heating chamber 63. The apparatus further includes a combustion-supporting air fan 18, an air preheating device 17, a steam superheater 60, and a chimney 19. The combustion-supporting air fan 18 is adapted for providing combustion-supporting air for the external fuel combustion device 24 and the gas mixture combustion device 26. The air preheating device 17 has an inlet and an outlet. An outlet of the combustion-supporting air fan 18 is connected with the inlet of the air preheating device 17, and the outlet of the air preheating device 17 is connected via a combustion-supporting air conduit 28 with gas inlets of the external fuel combustion device 24 and the gas mixture combustion device 26. The inlet of the air preheating device 17 is coupled with an emission opening 16 of the combustion chamber 15. The air preheating device 17 is disposed over the steam superheater 60. The outlet of the air preheating device 17 is connected to the chimney 19. Smoke generated in the combustion chamber 15 is exhausted out from the emission opening 16 of the air preheating device 17.

The apparatus further includes a column-shaped washing tower 39, a gas transporter 52, a circulating water tank 48, and a pump 47. The column-shaped washing tower 39 has a gas inlet 42, a water outlet 41, a dreg removing opening 46 configured at a bottom side of the washing tower 39, a gas outlet 43 configured at a top side of the washing tower 39, and a water inlet 40 and a maintenance door 7 configured at an upper side of the washing tower 39. The washing tower 39 includes an annular water conduit 64. The water conduit has one end coupled to the water inlet 40 of the washing tower 39, and another end coupled with a sprayer 45. Through-hole plates 44 configured with a plurality of through-holes are provided above the annular water conduit 64 and below the sprayer 45 respectively. The gas transporter 52 includes an inlet and an outlet. The gas outlet 43 of the washing tower 39 is connected with the inlet of the gas transporter 52. The outlet of the gas transporter 52 is coupled to the inlet of the gas mixture combustion device 26 via a gas mixture conduit 27. The circulating water tank 48 includes a circulation water inlet 49 connected to the water outlet 41 of the washing tower 39, and a circulation water outlet 50 connected to a water inlet of the pump 47. The pump 47 has a water outlet coupled to the water inlet 40 of the washing tower 39.

The combustion chamber 15 is provided with a temperature sensor 4 at an inner wall of the combustion chamber 15 for detecting a temperature inside the combustion chamber 15.

According to an aspect of the second embodiment of the present invention, the inner wall of the combustion chamber 15 is configured with a light weight steel skeleton provided with a high-temperature refractory material 30. The high-temperature refractory material 30 is configured with alumino-silicate fiber plates. The combustion chamber 15 further includes a metallic housing 29, and a heat insulating material layer 31 between the inner wall and the metallic housing 29 of the combustion chamber 15. Preferably, the heat insulating material layer 31 is a glass fiber plate.

In operation, when the combustion chamber 15 is heated so that a temperature inside the combustion chamber 15 reaches 200° C., the activated coke is loaded inside the heating chamber 63. Preferably, the volume of the activated coke loaded inside the heating chamber 63 is about 30% of the volume of the heating chamber 63. Then, when the combustion chamber 15 is further heated so that the temperature inside the combustion chamber 15 reaches 800° C., the temperature remains constant and lasts for 60 minutes at 800° C. Then, when the temperature inside the combustion chamber 15 reaches 650° C., a steam is provided inside the heating chamber 63. Preferably, the steam is provided with a rate of 0.3 m$^3$/(ton of activated coke).

The apparatus further includes a steam shunting cylinder 54 having a steam inlet 57 and a steam outlet 58. The steam inlet 57 of the steam shunting cylinder 54 is connected to an external steam conduit via a valve. The steam outlet 58 of the steam shunting cylinder 54 is connected to a steam inlet of a steam flow meter 59 via a valve. The steam flow meter 59 has a steam outlet coupled to a superheated steam inlet 61 of the steam superheater 60. The steam shunting cylinder 54 is provided with a pressure gauge 55 and a drain valve 56.

The superheated steam outlet 62 of the steam superheater 60 is coupled to a steam inlet 5 of the discharging chamber 1. The steam superheater 60 is made of high-temperature resistant stainless steel, and is assembled at an inside bottom of the combustion chamber 15 for increasing the temperature of the steam inputted into the heating chamber 63.

The apparatus further includes a controlling cabinet 53 adapted for controlling the operation of the apparatus and monitoring the temperature inside the combustion chamber 15, adjusting the rotation speed of the heating chamber 63, and switching the rotation direction of the heating chamber 63. The apparatus includes a base 68, and all of the above-mentioned elements are assembled on the base 68.

In the third embodiment of the present invention, the activated coke is prepared by sequentially conducting drying, dry distillation, and activation processes with the selected raw material, i.e., semi-coke.

The prepared activated coke has an Iodine adsorption value of 563 mg/g in treating the industrial wastewater and sewage.

After being used in treating the industrial wastewater and sewage, the Iodine adsorption value of the activated coke decreases to 219 mg/g.

After being regenerated by the apparatus of the present invention, the Iodine adsorption value of the regenerated activated coke is equal to or greater than 578 mg/g.

When the apparatus is used for regenerating an activated coke used for treating the industrial wastewater or sewage, at first, the external fuel combustion device 24 is ignited, so that a temperature inside the combustion chamber 15 starts to increase. When the temperature inside the combustion chamber 15 reaches 200° C., the gearing 35 is turned on to drive the discharging chamber 1 to clockwise rotate, and at the same time the screw conveyor 37 is turned on to convey the activated coke from the feeding storage 38 via the loading conduit 36 to the inlet pipe 8. The activated coke is then transferred into the heating chamber 63 by the screw guiding plates 33, during which each cleaning plate 65 prevents two adjacent screw guiding plates 33 from being clogged by the activated coke. The temperature inside the combustion chamber 15 is further raised to 800° C.

Then, the pump 47 is turned on. When the used activated coke is heated inside the heating chamber 63, the water content contained therein starts to evaporate and become steam. The steam then enters the inlet pipe 8, the gas collecting chamber 20 from the heating chamber 63, and is finally exhausted from the exhaust gas outlet 22. Then, the steam enters into the washing tower 39 via the inlet 42 of the washing tower 39, and flows upwardly inside the washing tower 39. The flow is uniformed by the through-hole plates 44, and flows along a reverse direction relative to a water flow sprayed from the sprayer 45. The steam is cooled and dedusted inside the washing tower 39, and is converted into condensate water, and is then provided into the circulating water tank 48 via the water outlet 41 of the washing tower 39.

When the temperature inside the combustion chamber 15 reaches 400° C. or above, organic contents contained in the activated coke starts to decompose and generate a gas mixture including carbon monoxide, nitrogen, hydrogen, carbon dioxide, steam, methane, ethane, and ethylene. The gas mixture flows via the inlet pipe 8, the gas collecting chamber 20, and is exhausted from the exhaust gas outlet 22, and enters the washing tower 39 via the inlet 42 of the washing tower 39, and flows upwardly inside the washing tower 39. The flow of the gas mixture is uniformed by the through-hole plates 44, and flows along the reverse direction relative to the water flow sprayed from the sprayer 45. The gas mixture is cooled and dedusted inside the washing tower 39, and the steam contained in gas mixture is converted into condensate water, and is then provided into the circulating water tank 48 via the water outlet 41 of the washing tower 39. Correspondingly, the rest of the gas mixture including carbon monoxide, nitrogen, hydrogen, carbon dioxide, methane, ethane, and ethylene becomes a combustible gas mixture. The combustible gas mixture is then delivered from the gas outlet 43, via the gas transporter 52, and the gas mixture conduit 27, to the gas mixture combustion device 26 of the combustion chamber 15 for combusting there. Meantime, the volume of the heat provided from the external fuel combustion device 24 can be gradually reduced in accordance with the monitored temperature inside the combustion chamber 15.

When the temperature inside the combustion chamber 15 reaches 650° C., the valve of the steam outlet 58 of the steam shunting cylinder 54 is switched on, and then the steam flows via the steam flow meter 59, the superheated steam inlet 61, the steam superheater 60, the superheated steam outlet 62, to the discharging chamber 1, and then flows from the discharging chamber 1 via the inlet pipe 8, and is finally inputted to the heating chamber 63. The rate of inputting the steam to the heating chamber 63 is about 0.3 m$^3$/(ton of activated coke), which can be controlled by adjusting the steam flow meter 59.

When the temperature inside the combustion chamber 15 reaches 800° C., the temperature is maintained constant for about 60 minutes, and then the valve of the steam outlet 58 of the steam shunting cylinder 54 is shut off. When there is no gas mixture exhausted out from the heating chamber 53 and when the temperature inside the combustion chamber 15 decreases to 250° C., the heating chamber 63 is counterclockwise rotated, viewing from the position of the discharging chamber 1. Accordingly, the material (i.e., activated coke) inside the heating chamber 63 is guided by the protrusion plates 32 and the guiding plates 14 to the outlet pipe 12, and is then driven by the screw guiding plates 33 to enter the discharging chamber 1, and is finally discharged from the discharging opening 2.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An apparatus for regenerating an activated coke, comprising:
    a heating chamber, having a first end, a second end, and an inner wall, wherein the heating chamber comprising a plurality of rows of protrusion plates configured inwardly protruding from the inner wall of the heating chamber, wherein each row of protrusion plates is distant from a next row for a predetermined distance, and each row of protrusion plates comprises a plurality of protrusion plates, and each protrusion plate remains a gap away from a next one;
    a combustion chamber, wherein the heating chamber is disposed inside the combustion chamber and an outer wall of the heating chamber remains apart from an inner wall of the combustion chamber, wherein the combustion chamber comprises an external fuel combustion device and a gas mixture combustion device disposed at a sidewall of the combustion chamber and a bottom of the heating chamber respectively for heating the activated coke inside the heating chamber, wherein the external fuel combustion device consumes an externally supplied fuel, and the gas mixture combustion device consumes the gas mixture generated by thermal decomposing an organic ingredient of the activated coke;
    an inlet pipe, coupled to the first end of the heating chamber, wherein the inlet pipe comprises a plurality of screw guiding plates secured to an inner wall of the inlet pipe, the screw guiding plates of the inlet pipe define an included angle relative to an axial direction of the inlet pipe, and the included angle of the screw guiding plates of the inlet pipe is about dextral 3° to 15°, wherein a cofferdam is circularly configured at an ending portion of the inlet pipe along the inner wall of the inlet pipe for preventing the activated coke from backflowing when loading the activated coke into the heating chamber, and the cofferdam has an inner edge distant from an axial center of the inlet pipe for a predetermined distance;
    an outlet pipe, coupled to the second end of the heating chamber, wherein the second end of the heating chamber is configured with a cone shape for coupling with the outlet pipe, and the cone shape of the second end comprises a guiding plate configured therein for guiding the activated coke to move toward a certain direction, wherein the outlet pipe comprises a plurality of screw guiding plates secured to an inner wall of the outlet pipe, the screw guiding plates of the outlet pipe define an included angle relative to an axial direction of the outlet pipe, and the included angle of the screw guiding plates of the outlet pipe is about sinistral 3° to 15°;
    a gearing, adapted for driving the outlet pipe to carry the heating chamber to rotate together;
    a gas collecting chamber, coupled to the inlet pipe, wherein the gas collecting chamber has an exhaust gas outlet, and comprises a loading conduit having a first end and a second end, wherein the second end of the loading conduit extends through a side wall of the gas collecting chamber and configure a through opening thereby, wherein the gas collecting chamber further comprises an exhausting opening configured at a bottom of the gas collecting chamber for discharging exceeded activated coke;
    a screw conveyor, assembled over the gas collecting chamber, wherein the screw conveyor comprises a discharging port coupled to the first end of the loading conduit;
    a feeding storage, positioned over the screw conveyor;
    a discharging chamber, coupled to the outlet pipe, wherein the discharging chamber has a steam inlet;
    a steam superheater, having a superheated steam outlet coupled to the steam inlet of the discharging chamber;
    a washing tower, having a gas inlet coupled to the exhaust gas outlet of the gas collecting chamber, a gas outlet, a water inlet and a water outlet;
    a circulation water tank, having a water inlet and a water outlet, wherein the water inlet of the circulation water tank is coupled to the water outlet of the washing tank; and
    a pump having a water inlet and a water outlet, wherein the water inlet of the pump is coupled to the water outlet of the washing tank, and the water outlet of the pump is coupled to the water inlet of the washing tank.

2. The apparatus as claimed in claim 1, wherein a sealing device is provided for sealing each of a connection between the outlet pipe and the discharging chamber and a connection between the inlet pipe and the gas collecting chamber.

3. The apparatus as claimed in claim 1, wherein a cleaning plate is provided between each two adjacent screw guiding plates, and secured to a rack, and the rack has an end secured to the loading conduit.

4. The apparatus as claimed in claim 1, wherein the discharging chamber comprises a discharging opening configured at a bottom of the discharging chamber, and further comprises an observing window, a temperature sensor, a negative pressure detection port, and a maintenance door configured at an outer sidewall of the discharging chamber.

5. The apparatus as claimed in claim 1, wherein the gas collecting chamber comprises a temperature sensor, a negative pressure detection port, and a maintenance door configured at an outer sidewall of the gas collecting chamber.

6. The apparatus as claimed in claim 1, further comprising a controlling cabinet electrically coupled to the combustion chamber and the heating chamber for controlling the temperature inside the combustion chamber, and adjusting the rotation speed of the heating chamber, and switching the rotation direction of the heating chamber.

* * * * *